Patented Apr. 6, 1937

2,076,098

UNITED STATES PATENT OFFICE 2,076,098

SATURATED ALCOHOLS OF THE CYCLOPENTANO PHENANTHRENE SERIES, AND METHOD OF PRODUCING THE SAME

Walter Schoeller, Berlin-Westend, and Friedrich Hildebrandt, Hohen Neuendorf, near Berlin, Germany, assignors to Schering-Kahlbaum A.-G., Berlin, Germany, a corporation of Germany No Drawing. Application March 1, 1935, Serial No. 8,842. In Germany December 7, 1933

10 Claims. (Cl. 260—153)

This invention relates to organic compounds of therapeutic value and more particularly to physiologically active compounds having the property of the male sex hormone and a method of making the same.

In the U. S. application Serial No. 748,664 a process is described by which it is possible to convert the follicle hormones with ketonic functions into the corresponding secondary or tertiary alcohols.

Now, it was found that saturated alcohols can be produced from said compounds which contain aromatic rings or double bonds in their molecule by hydrogenation of the latter in the usual manner to complete saturation of the carbon-double bonds.

Thus, the corresponding hydroaromatic compounds are obtained, for instance, by catalytically hydrogenating the alcohols produced according to the process described in the above-named application by reacting follicle hormones or the unsaturated hormones, equiline, hippoline and the like, with organo-metal compounds or by other means. Said hydrogenation products prove very effective on physiological assaying, for instance, by the capon comb test known for testing the activity of the male sex hormone.

Instead of catalytically activated hydrogen one may use hydrogen which has been activated by other methods as, for instance, atomic hydrogen or hydrogen in statu nascendi as it is obtained, for example, by the application of an alkali metal, such as sodium metal, on the alcoholic solution of the starting material.

The reaction in question, will be more readily understood by the following structural formulas and equations:

Starting materials:        Final products:

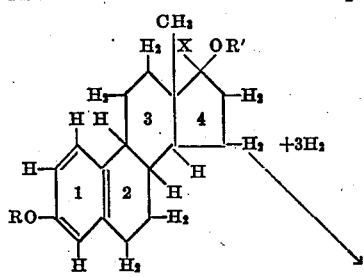

Compound obtained from follicle hormone by the Grignard reaction.

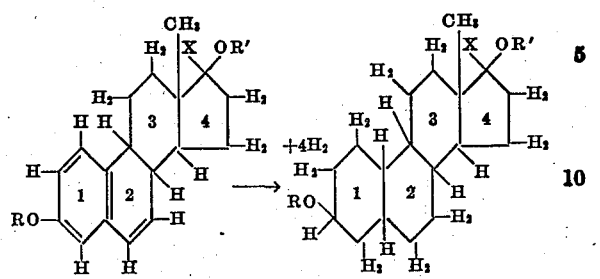

Compound obtained from equiline and hippoline by the Grignard reaction.

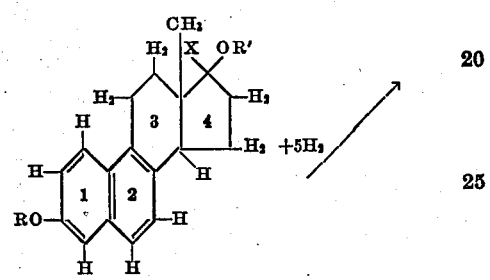

Compound obtained from equilenin by the Grignard reaction.

In these formulas there indicate X a hydrocarbon radical, such as the methyl, ethyl, propyl, isopropyl, amyl, phenyl and the like groups and R and R' either hydrogen or acyl groups, such as the acetyl, benzoyl, salicyl, phthalyl and the like groups.

Hence, it follows that not only the free alcohols but also their mono- or diacyl compounds can be transformed into the corresponding hydroaromatic compounds of the physiological activity similar to that of the male sex hormone. This method provides a simple way of producing male sex hormone-like compounds which, hitherto, were available only with difficulty.

The following examples serve to illustrate the invention without, however, limiting the same to them:

Example 1

1.5 g. of the tertiary alcohol of the formula $C_{19}H_{26}O_2$ produced by the reaction of crystallized follicle hormone with methyl magnesium iodide, are dissolved in 150 cc. of glacial acetic acid, and the solution is shaken, after the addition of 200 mg. of platinum oxide catalyst according to Adams-Shriner, for 18 hours in a hydrogen atmosphere. After the absorption of 6 atoms of hydrogen the hydrogenation practically ceases. The reaction solution is freed from the catalyst and then evaporated in a vacuum to dryness. A slightly coloured, viscous resin remains which shows values agreeing with the formula $C_{19}H_{32}O_2$ on C- and H-analysis. The product dissolves in concentrated sulfuric acid with a pure yellow color and shows in this solution, under the analytical quartz lamp, a yellow color and fluorescence, whilst the original material shows a blue-green color and fluorescence under the same conditions. On physiologically assaying the same by capon comb test the compound exhibits a physiological effectivity of 4 mg. per capon unit.

Example 2

1 g. of ethyl dihydro follicle hormone with a physiological effectivity of 10 million mouse units/g. assayed by the Allen-Doisy test is dissolved in 150 cc. of ethanol and is hydrogenated in the presence of 1 g. of a previously reduced chromium-nickel catalyst at 180° and a hydrogen pressure of 100 atmospheres. When the absorption of the hydrogen ceases, the reaction solution is freed from the catalyst and is evaporated to dryness in a vacuum. There remains as residue a tough, very viscous resin that is effective in the capon comb test with 4 mg. for the capon unit. The preparation on C- and H-analysis gives values corresponding to the formula $C_{20}H_{34}O_2$.

In a similar manner as described in the two examples other compounds of the above mentioned structure may be reduced or hydrogenated. The methods of hydrogenating aromatic compounds to hydroaromatic products are known to every chemist and do not need to be described more in detail. Of course, in the case of hydrogenating the acyl compounds to produce hydrogenated acyl derivatives, only such hydrogenating agents and conditions should be employed which cause no saponification of the acyl compounds to take place.

Many other changes and modifications in the processes and reagents may be made by those skilled in the art in accordance with the principles set forth herein and in the claims annexed hereto.

What we claim, is:

1. A method of producing saturated compounds of the cyclopentano phenanthrene series, having the physiological activity of the male sex hormone and corresponding to the structural formula

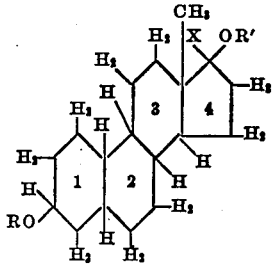

wherein X indicates a hydrocarbon radical and R and R' are substituting radicals of the group consisting of hydrogen and acyl groups, comprising subjecting cyclopentano polyhydrophenanthrene compounds of the general formula $C_{18}H_n(OR)\cdot(OR')\cdot X$ wherein $n$ indicates the numerals 17, 19 or 21, and X is attached to the cyclopentano ring while —OR is a phenolic group and OR' an alcoholic group, to the action of hydrogenating agents capable of hydrogenating the carbon-carbon double bonds in said starting material.

2. A method according to claim 1 wherein said starting material is subjected to the action of catalytically activated hydrogen.

3. A method according to claim 1 wherein said starting material is subjected to the action of catalytically activated hydrogen under pressure.

4. A method according to claim 1 wherein said starting material is subjected to the action of catalytically activated hydrogen under pressure in the presence of a solvent for said starting material.

5. A method according to claim 1 wherein said starting material is subjected to the action of hydrogen in statu nascendi.

6. A method according to claim 1 wherein an alcoholic solution of said starting material is subjected to the action of an alkali metal.

7. Compounds having the physiological activity of the male sex hormone and having a composition corresponding to the structural formula

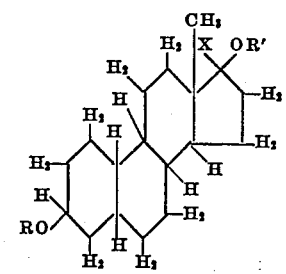

wherein X indicates a hydrocarbon radical and R and R' substituting radicals of the group consisting of hydrogen and acyl groups.

8. A compound having the physiological activity of the male sex hormone and having a composition corresponding to the structural formula

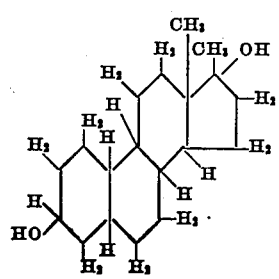

said compound dissolving in concentrated sulfuric acid with a yellow color and showing in this solution a yellow color and fluorescence when exposed to the rays of an analytical quartz lamp.

9. A compound having the physiological activity of the male sex hormone and having a composition corresponding to the structural formula
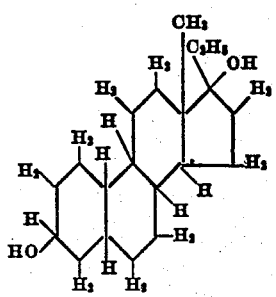
10. Compounds having the physiological activity of the male sex hormone and having a composition corresponding to the structural formula
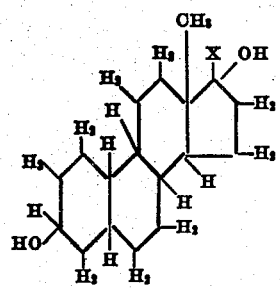
wherein X indicates a hydrocarbon radical.
WALTER SCHOELLER.
FRIEDRICH HILDEBRANDT.